(12) United States Patent
Zhang et al.

(10) Patent No.: US 8,755,304 B2
(45) Date of Patent: Jun. 17, 2014

(54) TIME OF ARRIVAL BASED POSITIONING FOR WIRELESS COMMUNICATION SYSTEMS

(75) Inventors: Xiaoxin Zhang, Sunnyvale, CA (US); Ning Zhang, Saratoga, CA (US)

(73) Assignee: QUALCOMM Incorporated, San Diego, CA (US)

(*) Notice: Subject to any disclaimer, the term of this patent is extended or adjusted under 35 U.S.C. 154(b) by 186 days.

(21) Appl. No.: 13/278,642

(22) Filed: Oct. 21, 2011

(65) Prior Publication Data

US 2013/0100850 A1    Apr. 25, 2013

(51) Int. Cl.
*H04L 12/28* (2006.01)
*G01S 5/02* (2010.01)
*G01S 5/14* (2006.01)
*G01S 13/87* (2006.01)

(52) U.S. Cl.
CPC ............ *G01S 5/0205* (2013.01); *G01S 13/878* (2013.01); *G01S 5/14* (2013.01)
USPC ........................................................ 370/254

(58) Field of Classification Search
CPC ...... H04W 24/02; H04W 84/12; H04L 29/06; H04L 67/16
USPC ........................................................ 370/254
See application file for complete search history.

(56) References Cited

U.S. PATENT DOCUMENTS

| | | | |
|---|---|---|---|
| 6,034,635 A | 3/2000 | Gilhousen | |
| 6,166,685 A | 12/2000 | Soliman | |
| 6,266,014 B1 | 7/2001 | Fattouche et al. | |
| 6,420,999 B1 | 7/2002 | Vayanos | |
| 6,618,005 B2 | 9/2003 | Hannah et al. | |
| 6,744,398 B1 | 6/2004 | Pyner et al. | |
| 7,289,813 B2 | 10/2007 | Karaoguz | |
| 2001/0053699 A1 | 12/2001 | McCrady et al. | |

(Continued)

FOREIGN PATENT DOCUMENTS

WO    2012170046 A1    12/2012
WO    2012170062 A1    12/2012

(Continued)

OTHER PUBLICATIONS

International Search Report and Written Opinion—PCT/US2012/061081—ISA/EEPO—Mar. 27, 2013.

(Continued)

*Primary Examiner* — Dang Ton
*Assistant Examiner* — Nourali Mansoury
(74) *Attorney, Agent, or Firm* — DeLizio Gilliam, PLLC

(57) ABSTRACT

A TOA positioning system can be implemented to improve location estimation of a wireless network device. A first subset of a plurality of reference wireless network devices for determining potential locations of the wireless network device and a second subset of the plurality of reference wireless network devices for determining an estimated location of the wireless network device can be selected. The first and the second subsets can be selected based on a plurality of distance measurements and an average distance and associated with each of the plurality of reference wireless network devices. The potential locations of the wireless network device can be determined based on the first subset of the plurality of reference wireless network devices. The estimated location of the wireless network device can be determined from the potential locations of the wireless network device based on the second subset of the plurality of reference wireless network devices.

29 Claims, 5 Drawing Sheets

(56) References Cited

U.S. PATENT DOCUMENTS

| | | | |
|---|---|---|---|
| 2002/0155845 | A1 | 10/2002 | Martorana |
| 2002/0196184 | A1 | 12/2002 | Johnson et al. |
| 2003/0134647 | A1 | 7/2003 | Santhoff et al. |
| 2004/0008138 | A1 | 1/2004 | Hockley et al. |
| 2004/0147269 | A1 | 7/2004 | Kim |
| 2004/0258012 | A1 | 12/2004 | Ishii |
| 2004/0264407 | A1 | 12/2004 | Tang et al. |
| 2005/0135257 | A1 | 6/2005 | Stephens et al. |
| 2007/0121560 | A1 | 5/2007 | Edge |
| 2007/0296633 | A1 | 12/2007 | Yanagihara |
| 2008/0103696 | A1 | 5/2008 | Cheok et al. |
| 2008/0125161 | A1 | 5/2008 | Ergen et al. |
| 2008/0130604 | A1 | 6/2008 | Boyd |
| 2008/0188236 | A1 | 8/2008 | Alles et al. |
| 2008/0248741 | A1 | 10/2008 | Alizadeh-Shabdiz |
| 2008/0287139 | A1 | 11/2008 | Carlson et al. |
| 2009/0280825 | A1 | 11/2009 | Malik et al. |
| 2010/0130225 | A1 | 5/2010 | Alles et al. |
| 2010/0135178 | A1 | 6/2010 | Aggarwal et al. |
| 2010/0150117 | A1 | 6/2010 | Aweya et al. |
| 2011/0059752 | A1 | 3/2011 | Garin et al. |
| 2011/0117925 | A1 | 5/2011 | Sampath et al. |
| 2011/0136506 | A1 | 6/2011 | Stewart |
| 2011/0143811 | A1* | 6/2011 | Rodriguez ............. 455/556.1 |
| 2011/0188389 | A1 | 8/2011 | Hedley et al. |
| 2011/0244881 | A1 | 10/2011 | Bando et al. |
| 2011/0304506 | A1 | 12/2011 | Choi |
| 2012/0087272 | A1 | 4/2012 | Lemkin et al. |
| 2012/0314587 | A1 | 12/2012 | Curticapean |
| 2012/0315919 | A1 | 12/2012 | Hirsch |
| 2013/0005347 | A1 | 1/2013 | Curticapean |
| 2013/0072217 | A1 | 3/2013 | Zhang et al. |
| 2013/0072218 | A1 | 3/2013 | Zhang et al. |
| 2013/0072219 | A1 | 3/2013 | Zhang et al. |
| 2013/0072220 | A1 | 3/2013 | Zhang |
| 2013/0101173 | A1* | 4/2013 | Holeva et al. ............. 382/104 |
| 2013/0148514 | A1 | 6/2013 | Zhang et al. |

FOREIGN PATENT DOCUMENTS

| | | | |
|---|---|---|---|
| WO | 2013002812 | A2 | 1/2013 |
| WO | 2013043664 | | 3/2013 |
| WO | 2013043675 | | 3/2013 |
| WO | 2013043681 | | 3/2013 |
| WO | 2013043685 | | 3/2013 |
| WO | 2013059636 | | 4/2013 |
| WO | 2013086393 | A1 | 6/2013 |

OTHER PUBLICATIONS

U.S. Appl. No. 13/155,037 Office Action, Apr. 3, 2013, 20 pages.
U.S. Appl. No. 13/158,029 Office Action, Oct. 3, 2012, 18 pages.
U.S. Appl. No. 13/236,172 Office Action, Jun. 7, 2012, 25 pages.
U.S. Appl. No. 13/236,208 Office Action, Nov. 7, 2012, 14 pages.
U.S. Appl. No. 13/236,232 Office Action, Oct. 11, 2012, 13 pages.
International Search Report and Written Opinion—PCT/US2011/043781—ISA/EPO—Nov. 17, 2011.
International Search Report and Written Opinion—PCT/US2011/046074—ISA/EPO—Dec. 16, 2011.
International Search Report and Written Opinion—PCT/US2011/054977—ISA/EPO—Jan. 31, 2012.
Co-pending U.S. Appl. No. 13/155,037, filed Jun. 7, 2011.
Co-pending U.S. Appl. No. 13/158,029, filed Jun. 10, 2011.
Co-pending U.S. Appl. No. 13/170,353, filed Jun. 28, 2011.
Co-pending U.S. Appl. No. 13/236,172, filed Sep. 19, 2011.
Co-pending U.S. Appl. No. 13/236,208, filed Sep. 19, 2011.
Co-pending U.S. Appl. No. 13/236,232, filed Sep. 19, 2011.
Co-pending U.S. Appl. No. 13/236,259, filed Sep. 19, 2011.
Co-pending U.S. Appl. No. 13/315,174, filed Dec. 8, 2011.
Foy, W.H., "Position-Location Solutions by Taylor-Series Estimation", IEEE Transactions on Aerospace and Electronic Systems, IEEE Service Center, Piscataway, NJ, US, vol. AES-10, No. 2, Mar. 1, 1976, pp. 187-194, XP011166129, ISSN: 0018-9251.
Kleine-Ostmann, T., et al., "A data fusion architecture for enhanced position estimation in wireless networks", IEEE Communications Letters, IEEE Service Center, Piscataway, NJ, US, vol. 5, No. 8, Aug. 1, 2001, pp. 343-345, XP011423565, ISSN: 1089-7798, DOI: 10.1109/4234.940986 Sections II and III.
Li, H., et al., "Combination of Taylor and Chan method in mobile positioning", Cybernetic Intelligent Systems (CIS), 2011 IEEE 10th International Conference on, IEEE, Sep. 1, 2011, pp. 104-110, XP932136955, DOI : 10.1109/ CIS.2011.6169143 ISBN: 978-1-4673-0687-4 Abstract Sections I-III.
Shen, G., et al., "Performance comparison of TOA and TDOA based location estimation algorithms in LOS environment", (WPNC '08) 5th, IEEE, Mar. 27, 2008, pp. 71-78, XP031247832, ISBN: 978-1-4244-1798-8 Section II {TOA Based Location Estimation Algorithms}: "C. Taylor Series Method".
Gholami, Mohammad R. et al., "Positioning algorithms for cooperative networks in the presence of an unknown turn-around time", 2011 IEEE 12th Workshop on Signal Processing Advancesin Wireless Communications (SPAWC 2011) IEEE Piscataway,NJ, USA, IEEE, Piscataway, NJ, USA, XP032035718, 001: 10.11 09/SPAWC.2011. 5990386; ISBN: 978-1-4244-9333-3 Jun. 26, 2011, 166-170.
Yu, K et al., "TOA-based distributed localisation with unknown internal delays and clock frequency offsets in wireless sensor networks", IET Signal Processing vol. 3, No. 2 XP006032603, ISSN: 1751-9683, 001: 10.1049I1ET-SPR:20080029 Mar. 2, 2009, 106-118.
"PCT Application No. PCT/US12/56017 International Search Report", Jan. 3, 2013, 14 pages.
"PCT Application No. PCT/US12/56053 International Search Report", Jan. 3, 2013, 13 pages.
PCT Application No. PCT/US2012/056036 International Search Report, Jan. 3, 2013, 13 pages.
"PCT Application No. PCT/US2012/068543 International Search Report", Feb. 15, 2013, 15 pages.
"PCT/US2012/056046 International Search Report", Jan. 3, 2013, 13 pages.
"U.S. Appl. No. 13/236,172 Office Action", Jan. 3, 2013, 25 pages.
"PCT Application No. PCT/US2011/043781 International Preliminary Report on Patentability", Jun. 7, 2013, 4 pages.
"PCT Application No. PCT/US2011/046074 International Preliminary Report on Patentability", Jun. 27, 2013, 11 pages.
"PCT Application No. PCT/US2011/054977 International Preliminary Report on Patentability", Jun. 10, 2013, 8 pages.
"PCT Application No. PCT/US2012/061081 International Preliminary Report on Patentabililty", Sep. 13, 2013, 6 pages.
"U.S. Appl. No. 13/315,174 Office Action", Sep. 23, 2013, 23 pages.

* cited by examiner

TIME OF ARRIVAL BASED POSITIONING FOR WIRELESS COMMUNICATION SYSTEMS

BACKGROUND

Embodiments of the inventive subject matter generally relate to the field of wireless communication and, more particularly, to a hybrid time of arrival (TOA) positioning for wireless communication systems.

A wireless communication device can use various position estimation techniques to determine an unknown location of the wireless communication device based on communicating with a plurality of reference wireless communication devices with known locations. For example, the wireless communication device can employ round trip time (RTT) based positioning techniques by determining the travel time of radio signals from the wireless communication device to the reference wireless communication devices. The wireless communication device can determine the distance to the reference wireless communication devices based on the determined travel time of the radio signals and can use time of arrival (TOA) positioning techniques to determine the unknown location.

SUMMARY

Various embodiments of a hybrid time of arrival (TOA) positioning mechanism for wireless communication systems are disclosed. In one embodiment, a plurality of round trip transit time measurements is determined between a wireless network device and each of a plurality of reference wireless network devices of a communication network. For each of the plurality of reference wireless network devices, a plurality of distance measurements is determined between the wireless network device and the reference wireless network device based on a corresponding plurality of round trip transit time measurements between the wireless network device and the reference wireless network device. For each of the plurality of reference wireless network devices, an average distance is calculated between the wireless network device and the reference wireless network device based on a corresponding plurality of distance measurements between the wireless network device and the reference wireless network device. A first subset of the plurality of reference wireless network devices is selected for determining one or more potential locations of the wireless network device based, at least in part, on the average distance between the wireless network device and each of the plurality of reference wireless network devices and on the plurality of distance measurements between the wireless network device and each of the plurality of reference wireless network device. A second subset of the plurality of reference wireless network devices is selected for determining an estimated location of the wireless network device based, at least in part, on the first subset of the plurality of reference wireless network devices, the average distance between the wireless network device and each of the plurality of reference wireless network devices, and the plurality of distance measurements between the wireless network device and each of the plurality of reference wireless network device. The one or more potential locations of the wireless network device are determined based, at least in part, on the first subset of the plurality of reference wireless network devices. The estimated location of the wireless network device is determined from the one or more potential locations of the wireless network device based, at least in part, on the second subset of the plurality of reference wireless network devices.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
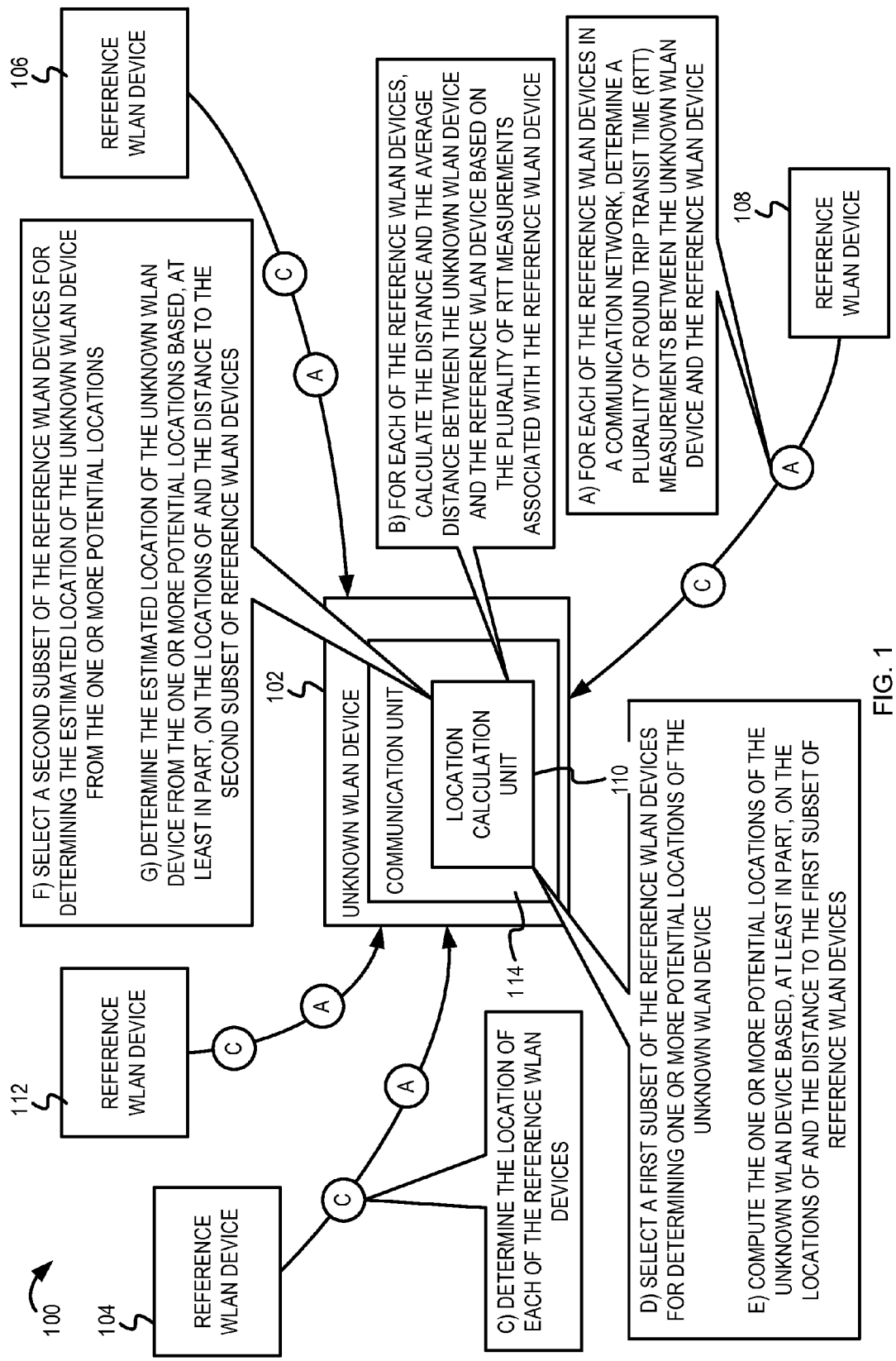
FIG. 1 is an example block diagram illustrating a mechanism for determining the unknown location of a network device in a wireless communication network.

The description that follows includes exemplary systems, methods, techniques, instruction sequences, and computer program products that embody techniques of the present inventive subject matter. However, it is understood that the described embodiments may be practiced without these specific details. For instance, although examples refer to wireless local area network (WLAN) devices (e.g., 802.11n compatible devices) executing the location estimation techniques described herein, embodiments are not so limited. In other embodiments, various other devices and standards (e.g., WiMAX) can execute the location estimation techniques. In other instances, well-known instruction instances, protocols, structures, and techniques have not been shown in detail in order not to obfuscate the description.

A network device associated with an unknown location ("unknown network device") can use a TOA positioning algorithm to determine its location based on a plurality of reference network devices. Conventionally, the TOA positioning algorithm uses (as an input) at least an estimated distance between the unknown network device and each reference network device to iteratively calculate the location of the unknown network device. However, the TOA positioning algorithm is usually very sensitive to the estimated distances to each of the reference network devices. An error in the estimated distance to even one of the reference network devices can cause an error in estimating the location of the unknown network device. It can be difficult to determine which of the distances to the reference network devices have been accurately estimated and which of the distances are erroneous. Therefore, using all of the estimated distances to determine the location of the unknown network device can affect the positioning accuracy associated with the location of the unknown network device.

In some embodiments, a positioning system that utilizes a subset of the estimated distances to the reference network devices can be implemented to improve positioning accuracy. The positioning system can determine a plurality of distance measurements between the unknown network device and each of the reference network devices. The positioning system can also determine an average distance between the unknown network device and each of the reference network devices based on the corresponding plurality of distance measurements. The positioning system can select a first subset of the reference network devices for determining one or more potential locations of the unknown network device based on the average distance and/or the plurality of distance measurements associated with the reference network devices. Similarly, the positioning system can also select a second subset of the reference network devices for estimating the location ("estimated location") of the unknown network device from the potential locations of the unknown network device. The positioning system can compute the potential locations of the unknown network device based, at least in part, on the first subset of reference network devices and can select the estimated location of the unknown network device from the potential locations based, at least in part, on the second subset of reference network devices. Such a mechanism for determining the location of the unknown network device can minimize the positioning error associated with determining the location of the unknown network device, increase positioning accuracy, improve performance gain, and consequently improve the overall performance of the unknown network device.

FIG. 1 is an example block diagram illustrating a mechanism for determining the unknown location of a network device in a wireless communication network 100. The wireless communication network 100 comprises a WLAN device 102 with an unknown location ("unknown WLAN device") and four reference WLAN devices 104, 106, 108, and 112. The unknown WLAN device 102 comprises a communication unit 114, which comprises a location calculation unit 110. The communication unit 114 can implement protocols and functionality to enable WLAN communication with the other WLAN devices 104, 106, 108, and 112 in the wireless communication network 100. It is noted that although not depicted in FIG. 1, in some embodiments one or more of the reference WLAN devices 104, 106, 108, and 112 can also comprise a location calculation unit and corresponding functionality for determining their respective location. In some implementations, the unknown WLAN device 102 and the reference WLAN devices 104, 106, 108, and 112 can each be electronic devices with WLAN communication capabilities, such as a laptop computer, a tablet computer, a mobile phone, a smart appliance, a gaming console, an access point, or other suitable electronic devices. For example, the reference WLAN devices 104, 106, 108, and 112 can be WLAN access points and the unknown WLAN device 102 can be a mobile phone configured to execute operations described below in stages A-G to determine its location. In some embodiments, in addition to WLAN communication protocols, the communication unit 114 can implement other protocols and functionality to enable other types of communications (e.g., Bluetooth®, Ethernet, WiMAX, powerline communications, etc.)

At stage A, the location calculation unit 110 determines, for each of the reference WLAN devices 104, 106, 108, and 112, a plurality of round trip transmit time (RTT) measurements between the unknown WLAN device 102 and the reference WLAN device. In one implementation, the location calculation unit 110 can transmit a plurality of control messages to the reference WLAN device 104 and can receive a corresponding plurality of response messages (e.g., acknowledgement (ACK) messages) from the reference WLAN device 104. The location calculation unit 110 can also record the time instants at which the control messages were transmitted to and the corresponding response messages were received from the reference WLAN device 104. The location calculation unit 110 can then calculate the plurality of RTT measurements between the unknown WLAN device 102 and the reference WLAN device 104 ("RTT measurements associated with the reference WLAN device") as the elapsed time between transmitting the control messages and receiving the corresponding response messages, as will further be described in blocks 304-310 of FIG. 3. Likewise, the location calculation unit 110 can also calculate the plurality of RTT measurements associated with the reference WLAN device 106, the plurality of RTT measurements associated with the reference WLAN device 108, and the plurality of RTT measurements associated with the reference WLAN device 112. It is noted that in other implementations, other suitable techniques can be employed to determine the RTT measurements associated with the reference WLAN devices 104, 106, 108, and 112.

At stage B, the location calculation unit 110 calculates, for each of the reference WLAN devices 104, 106, 108, and 112, a plurality of distance measurements and the average distance between the unknown WLAN device 102 and the reference WLAN device based on the plurality of RTT measurements associated with the reference WLAN device. The location calculation unit 110 can calculate the plurality of distance measurements associated with the reference WLAN device 104 based on the plurality of RTT measurements associated with the reference WLAN device 104, as will be described in Eq. 1 of FIG. 2. The location calculation unit 110 can then calculate the average distance between the unknown WLAN device 102 and the reference WLAN device 104 ("average distance associated with the reference WLAN device") based on the plurality of distance measurements, as will be described in Eq. 2 of FIG. 2. Likewise, the location calculation unit 110 can also calculate a plurality of distance measurements and the average distance associated with the reference WLAN devices 106, 108, and 112.

At stage C, the location calculation unit 110 determines the location of each of the reference WLAN devices 104, 106, 108, and 112. In some implementations, the location calculation unit 110 can request and receive location coordinates associated with each of the reference WLAN devices 104, 106, 108, and 112. For example, the location calculation unit 110 can transmit a request for the location coordinates in the control messages transmitted at stage A and can receive the location coordinates in the response messages. As another example, the location calculation unit 110 can transmit a location request message (distinct from the control messages transmitted at stage A) to each of the reference WLAN devices and can receive a corresponding location response message comprising the location coordinates associated with each of the reference WLAN devices. In another implementation, the location calculation unit 110 can query a centralized server (or can access a predetermined memory location) to determine the location coordinates associated with the reference WLAN devices 104, 106, 108, and 112. In another implementation, the reference WLAN devices 104, 106, 108, and 112 may broadcast their respective location coordinates at periodic intervals (e.g., in a beacon message or another suitable control message). The location calculation unit 110 can determine the location coordinates associated with the reference WLAN devices 104, 106, 108, and 112 based on receiving and analyzing the periodically received messages. It is noted that the location of the reference WLAN devices 104, 106, 108, and 112 can be expressed using any suitable coordinate system (e.g., Cartesian coordinate system, spherical coordinate system, latitudes and longitudes, geodesic coordinate system, etc.). Furthermore, the location of the reference WLAN devices can be expressed in any suitable number of dimensions (e.g., 2-dimensional coordinates (e.g., X and Y coordinates), 3-dimensional coordinates (e.g., X, Y, and Z coordinates), etc.).

At stage D, the location calculation unit 110 selects a first subset of the reference WLAN devices for determining one or more potential locations of the unknown WLAN device. In some implementations, the first subset of reference WLAN devices can be selected based on the average distance associated with the reference WLAN devices 104, 106, 108, and 112 and/or based on the plurality of distance measurements associated with the reference WLAN devices 104, 106, 108, and 112, as will be described below in FIGS. 2-4. For example, as will be described below, a predetermined number of the reference WLAN devices that are associated with the shortest average distances can be selected as the first subset of reference WLAN devices.

At stage E, the location calculation unit 110 computes one or more potential locations of the unknown WLAN device 102 based, at least in part, on the locations of each of the first subset of reference WLAN devices and the plurality of distance measurements to each of the first subset of reference WLAN devices. As will be described with reference to FIGS. 2-4, the location calculation unit 110 can compute one or more potential locations of the unknown WLAN device 102 based on the average distance associated with the first subset of reference WLAN devices (determined at stage B), the known locations of the first subset of reference WLAN devices (determined at stage C), an initial location of the unknown WLAN device 102, and a distance calibration constant. In some implementations, the initial location of the unknown WLAN device 102 can be zero, a randomly selected value, or a predetermined value. In some implementations, the distance calibration constant can be a predetermined value. However, if the predetermined value is unknown or not available, the distance calibration constant can also be zero or a randomly selected value. In other implementations, other suitable algorithms and techniques can be employed to determine the distance calibration constant and/or the initial location of the unknown WLAN device 102 and to ensure convergence to the estimated location of the unknown WLAN device 102. In some implementations, as will be described in FIGS. 2-4, the location calculation unit 110 can execute a Taylor series-based TOA positioning algorithm or a minimum mean square error (MMSE) based TOA positioning algorithm to determine the one or more potential locations of the unknown WLAN device 102. The location calculation unit 110 can then identify the estimated location of the unknown WLAN device 102 from the one or more potential locations, as will be described below in stages F and G.

At stage F, the location calculation unit 110 selects a second subset of the reference WLAN devices for selecting the estimated location of the unknown WLAN device 102 from the one or more potential locations. The second subset of reference WLAN devices can be selected based on the average distance associated with the reference WLAN devices and/or based on the plurality of distance measurements associated with the reference WLAN devices, as will be described below in FIGS. 2-4. In one implementation, as will be described below, a second predetermined number of the remaining reference WLAN devices that are associated with the shortest average distances can be selected from the remaining reference WLAN devices as the second subset of reference WLAN devices.

At stage G, the location calculation unit 110 identifies the estimated location of the unknown WLAN device 102 from the one or more potential locations based, at least in part, on the locations of the second subset of reference WLAN devices and the plurality of distance measurements to each of the second subset of reference WLAN devices. As will be described below in FIGS. 2-4, the location calculation unit 110 can select the estimated location of the unknown WLAN device 102 from the one or more potential locations (determined at stage E) based on the average distance associated with the second subset of reference WLAN devices (determined at stage B), the known locations of the second subset of reference WLAN devices (determined at stage C), and the distance calibration constant. It is noted that the estimated location of the unknown WLAN device 102 is one of the potential locations that is associated with the smallest location error (e.g., one of the potential locations that is estimated to be closest to the actual location of the unknown WLAN device 102).

Figure 2:
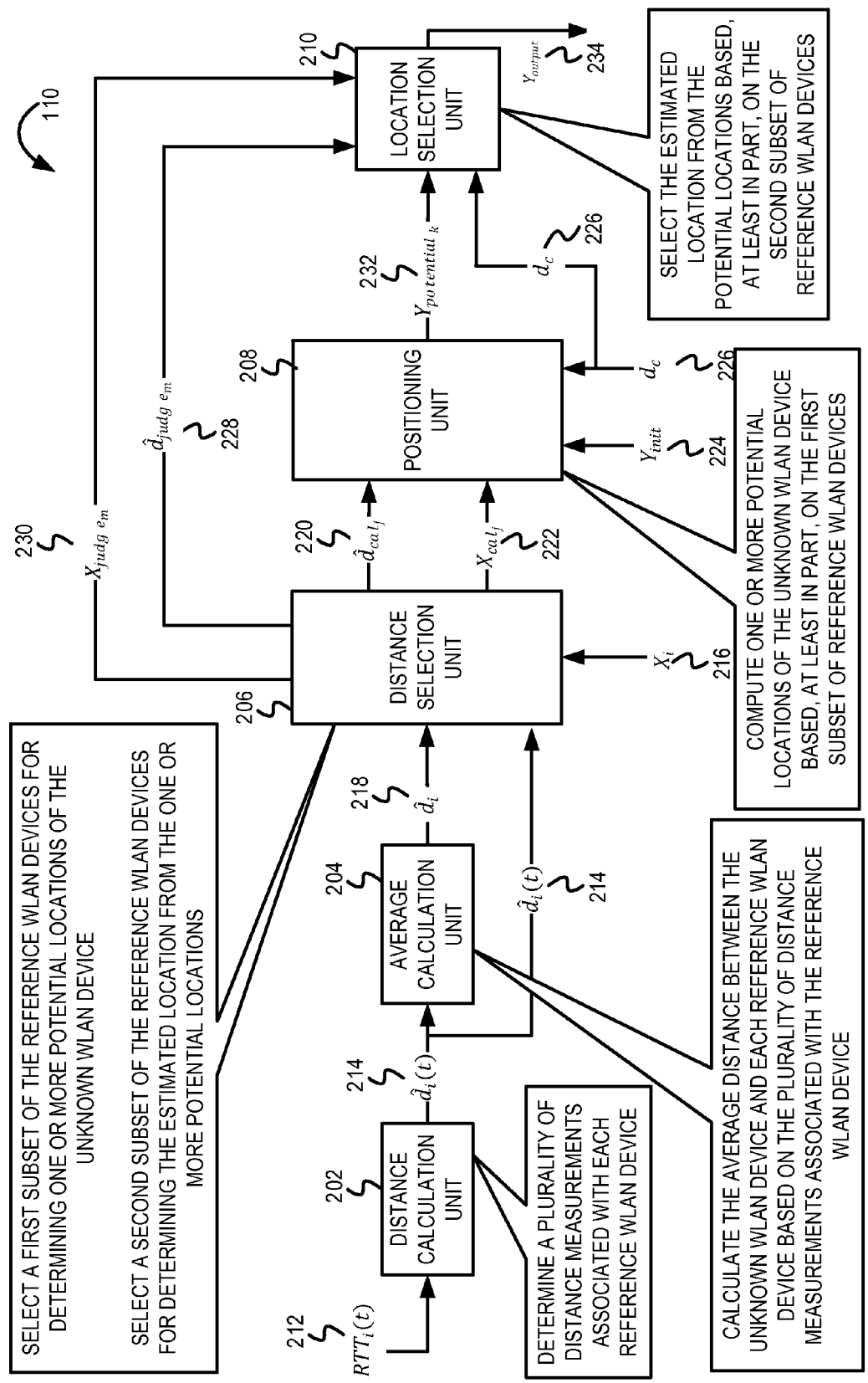
FIG. 2 is a block diagram of an example embodiment of the location calculation unit including a TOA positioning mechanism.

FIG. 2 is a block diagram of an example embodiment of the location calculation unit 110 including a TOA positioning mechanism. The location calculation unit 110 comprises a distance calculation unit 202, an average calculation unit 204, a distance selection unit 206, a positioning unit 208, and a location selection unit 210. The distance calculation unit 202 is coupled with the average calculation unit 204 and the distance selection unit 206. The average calculation unit 204 is also coupled with the distance selection unit 206. The distance selection unit 206 is coupled with the positioning unit 208 and the location selection unit 210. Finally, the positioning unit 208 is coupled with the location selection unit 210.

The distance calculation unit 202 can calculate a plurality of distance measurements between the unknown WLAN device 102 and each of the reference WLAN devices 104, 106, 108, and 112 based, at least in part, on a plurality of RTT measurements 212 associated with each of the reference WLAN devices. As depicted in FIG. 2, the input to the distance calculation unit 202 is $RTT_i(t)$ that represents the $t^{th}$ RTT measurement associated with the $i^{th}$ reference WLAN device. With reference to Figure if t represents a counter for the RTT measurements and T represents the number of RTT measurements to be determined, then the input to the distance calculation unit 202 for the $i^{th}$ reference WLAN device is $RTT_i(t)$ (i.e., $RTT_i(0), RTT_i(1), \ldots RTT_i(T-1)$) as depicted in FIG. 2. The outputs of the distance calculation unit 202 are a plurality of estimated distance measurements 214 ($\hat{d}_i(t)$) between the unknown WLAN device 102 and the $i^{th}$ reference WLAN device based on the plurality of RTT measurements 212. Thus, if $RTT_i(t)$ represents the $t^{th}$ RTT measurement associated with the $i^{th}$ reference WLAN device and c represents the speed of light, the $t^{th}$ distance measurement $\hat{d}_i(t)$ associated with the $i^{th}$ reference WLAN device can be calculated in accordance with Eq. 1.

$$\hat{d}_i(t) = c \times \frac{RTT_i(t)}{2} \qquad \text{Eq. 1}$$

The average calculation unit 204 can calculate the average distance between the unknown WLAN device 102 each of the reference WLAN devices based on the corresponding plurality of distance measurements associated with the reference WLAN device. As described above with reference to Eq. 1, the distance calculation unit 202 can determine the plurality of distance measurements $\hat{d}_i(t)$ 214 (e.g., a set of T distance measurements) for each of the reference WLAN devices. Next, the set of T distance measurements 214 can be provided as an input to the average calculation unit 204. The average calculation unit 204 can calculate an average distance ($\hat{d}_i$) 218 between the unknown WLAN device 102 and the $i^{th}$ reference WLAN device in accordance with Eq. 2.

$$\hat{d}_i = \frac{1}{T} \sum_{t=0}^{T-1} \hat{d}_i(t) \qquad \text{Eq. 2}$$

$$d_i = \hat{d}_i + d_c \qquad \text{Eq. 3}$$

It is noted that the actual distance ($d_i$) between the unknown WLAN device 102 and the $i^{th}$ reference WLAN device can be represented as the sum of a distance calibration constant ($d_c$) and the estimated distance ($\hat{d}_i$) 218 between the unknown WLAN device 102 and the $i^{th}$ reference WLAN device, as depicted in Eq. 3. The distance calibration constant ($d_c$) can represent the difference between the estimated distance ($\hat{d}_i$) 218 and the actual distance ($d_i$). The distance calibration constant may be indicative of the internal processing time (or turnaround time) associated with the reference WLAN devices. For example, the distance calibration constant can account for the elapsed time between the reference WLAN device detecting a control message from the unknown WLAN device 102 and the reference WLAN device transmitting a response message to the unknown WLAN device 102. The distance calibration constant may also depend on the type and configuration of the reference WLAN devices. In some implementations, the distance calibration constant may differ from one reference WLAN device to another, while in other implementations the distance calibration constant may not differ across the reference WLAN devices.

The distance selection unit 206 can select a first subset of the reference WLAN devices for determining one or more potential locations of the unknown WLAN device. As depicted in FIG. 2, the inputs to the distance selection unit 206 are known locations ($X_i$) 216 of the reference WLAN devices, the average distance 218 associated with each of the plurality of reference WLAN devices, and the plurality of distance measurements 214 associated with each of the reference WLAN devices. The distance selection unit 206 can select the first subset of the reference WLAN devices and can indicate, as the output, the average distances ($\hat{d}_{cal_j}$) 220 associated with the first subset of the reference WLAN devices and the known locations ($X_{cal_j}$) 222 of the first subset of the reference WLAN devices. In one implementation, the distance selection unit 206 may be configured to select J reference WLAN devices that are associated with the shortest average distances as the first subset of reference WLAN devices. In this implementation, the distance selection unit 206 can select the shortest J average distances ($\hat{d}_{cal_j}$) 220 from the N average distances 218 and can designate the J WLAN devices that are associated with the shortest J distances as the first subset of reference WLAN devices. In another implementation, the distance selection unit 206 may be configured to select J reference WLAN devices that are associated with the smallest variances ($\hat{V}_i$) as the first subset of reference WLAN devices. In this implementation, the distance selection unit 206 can select the J smallest variances, can identify the J WLAN devices that are associated with the smallest J variances, and can designate the identified J WLAN devices as the first subset of reference WLAN devices. For the $i^{th}$ reference WLAN device, the variance ($\hat{V}_i$) can be calculated in accordance with Eq. 4. As described above, $\hat{d}_i(t)$ represents the $t^{th}$ distance measurement associated with the $i^{th}$ reference WLAN device, T represents the total number of distance measurements, and $\hat{d}_i$ represents the average distance associated with the $i^{th}$ reference WLAN device. However, it is noted that in other implementations, the distance selection unit 206 can employ other suitable techniques to determine the first subset of reference WLAN devices. As will be described below, the first subset of reference WLAN devices can be used to determine one or more potential locations of the unknown WLAN device 102.

$$\hat{V}_i = \frac{1}{T} \sum_{t=0}^{T-1} \hat{d}_i^2(t) - \hat{d}_i^2 \qquad \text{Eq. 4}$$

In some implementations, the number (J) of devices associated with the first subset of the reference WLAN devices may be equal to or greater than the dimension of the location coordinate system. For example, if the location of the reference WLAN devices and the unknown WLAN device is expressed in terms of two-dimensional coordinates (i.e., D=2), then 2 of the reference WLAN devices may be selected as the first subset of reference WLAN devices (e.g., so that J=2). It is noted that in other implementations, the number of devices associated with the first subset of the reference WLAN devices may be configurable and may be independent of the dimension of the location coordinate system.

The distance selection unit 206 can select a second subset of the reference WLAN devices for identifying the estimated location of the unknown WLAN device 102 from the one or more potential locations. As depicted in FIG. 2, the inputs to the distance selection unit 206 are known locations 216 of the reference WLAN devices, the average distance 218 associated with each of the plurality of reference WLAN devices, and the plurality of distance measurements 214 associated with each of the reference WLAN devices. The distance selection unit 206 can select the second subset of the reference WLAN devices and can indicate, as the output, the average distances ($\hat{d}_{judge_m}$) 228 associated with the second subset of the reference WLAN devices and the known locations ($X_{judge_m}$) 230 of the second subset of the reference WLAN devices.

The distance selection unit 206 can employ various techniques to select the second subset of the reference WLAN devices. In one implementation, the J reference WLAN devices that were selected as the first subset of the reference WLAN devices (described above) may not be taken into consideration when selecting the second subset of the reference WLAN devices. If the distance selection unit 206 is configured to select M reference WLAN devices as the second subset of the reference WLAN devices, the remaining N–J reference WLAN devices can be analyzed to determine the M reference WLAN devices that constitute the second subset of the reference WLAN devices. In one example, the distance selection unit 206 can select the shortest M average distances ($\hat{d}_{judge_m}$) 228 from the remaining N–J average distances. The distance selection unit 206 can identify the M reference WLAN devices from the remaining N–J reference WLAN devices that are associated with the M shortest average distances. The distance selection unit 206 can then designate the M identified reference WLAN devices as the second subset of the reference WLAN devices. As another example, the distance selection unit 206 may be configured to select M reference WLAN devices that are associated with the smallest variances ($\hat{V}_i$) as the second subset of reference WLAN devices. In this example, the distance selection unit 206 can select the M distances that have the smallest variances ($\hat{V}_i$) from the remaining N–J average distances, can identify the M reference WLAN devices that are associated with the M smallest variances, and can designate the identified M reference WLAN devices as the second subset of reference WLAN devices. For the $i^{th}$ reference WLAN device, the variance ($\hat{V}_i$) can be calculated in accordance with Eq. 4.

In some implementations, all of the remaining reference WLAN devices (e.g., the N–J reference WLAN devices that were not selected as the first subset of reference WLAN devices) can be selected as the second subset of reference WLAN devices. In another implementation, a predetermined number of the remaining reference WLAN devices can be selected as the second subset of reference WLAN devices. It is also noted that in other implementations, the distance selection unit 206 can employ other suitable techniques to determine the second subset of reference WLAN devices. For example, the J reference WLAN devices that were selected as the first subset of the reference WLAN devices (described above) may not be eliminated from the plurality of reference WLAN devices and the M reference WLAN devices that constitute the second subset of the reference WLAN devices can be selected from the plurality of N reference WLAN devices. As another example, one or more of the first subset of the reference WLAN devices may be selected as the second subset of the reference WLAN devices. As another example, the first subset of the reference WLAN devices and the second subset of the reference WLAN devices may comprise the same reference WLAN devices. As will be further described below, the second subset of reference WLAN devices can be used to determine the estimated location of the unknown WLAN device 102 from the one or more potential locations of the unknown WLAN device 102.

The positioning unit 208 can compute one or more potential locations of the unknown WLAN device 102 based, at least in part, on the first subset of the reference WLAN devices. As depicted in FIG. 2, the average distance $\hat{d}_{cal_j}$ 220 associated with each of the first subset of the reference WLAN devices and the known location $X_{cal_j}$ 222 of each of the first subset of the reference WLAN devices are provided as inputs to the positioning unit 208. Additionally, the initial location ($Y_{init}$) 224 of the reference WLAN device 102 and the distance calibration constant 226 are also provided as inputs to the positioning unit 208. In some implementations, the distance calibration constant 226 can be a predetermined value. However, if the predetermined value is unknown or not available, the distance calibration constant 226 can be zero, a randomly selected value, or another suitable value that may be determined based on historical (or other) analysis. In other implementations, other suitable algorithms and techniques can be employed to determine the distance calibration constant 226 to enable convergence of operations described herein to the actual location of the unknown WLAN device 102. In one implementation, the initial location 224 of the unknown WLAN device can be zero, a predetermined value, or a randomly selected value. In other implementations, other suitable algorithms and techniques can be employed to determine the initial location 224 of the unknown WLAN device (e.g., an average, a weighted combination, etc. of the known locations of one or more of the reference WLAN devices) to enable convergence to the actual location of the unknown WLAN device 102. In some implementations, the initial location 224 of the unknown WLAN device 102 can be represented as $Y_{init} = \{y_{init}^s, s=0, 1, \ldots, D-1\}$, where D represents the dimension of the coordinate system used to specify the location of the unknown WLAN device (e.g., if the location of the unknown WLAN devices is specified in terms of X, Y, and Z coordinates, then D=3) and $y_{init}^s$ represents the value of the $s^{th}$ dimension of the initial location of the unknown WLAN device 102. The positioning unit 208 can then determine one or more potential locations 232 of the unknown WLAN device 102 based on the aforementioned inputs. In some implementations, each of the potential locations 232 of the unknown WLAN device 102 can be represented as $Y_{potential_k} = \{y_{potential_k}^s, s=0, 1, \ldots, D-1\}$, where $y_{potential_k}^s$ represents the value of the $s^{th}$ dimension of the $k^{th}$ potential location of the unknown WLAN device 102.

The positioning unit 208 can use various techniques to determine the one or more potential locations 232 of the unknown WLAN device 102. In one implementation, if the number of the first subset of the reference WLAN devices is equal to the dimension of the coordinate system (i.e., if J=D), then the positioning unit 208 can execute a MMSE based TOA positioning algorithm (e.g., by solving the expression depicted by Eq. 5a) to determine one or more potential locations 232 of the unknown WLAN device 102. In accordance with Eq. 5a, the positioning unit 208 can attempt to identify the one or more locations of the unknown WLAN device (i.e., the values of $Y_{potential_k}$) that minimize the sum (across the first subset of the reference WLAN devices) of the estimation error between A) the average distance to the $j^{th}$ WLAN device of the first subset of reference WLAN devices determined in Eq. 2 based on the plurality of distance measurements associated with the $j^{th}$ WLAN device of the first subset of reference WLAN devices and B) the estimated distance to the $j^{th}$ WLAN device of the first subset of reference WLAN devices based on the known location of the $j^{th}$ WLAN device of the first subset of reference WLAN devices. In Eq. 5a, $\|X_{cal_j} - Y_{potential_k}\|$ represents the estimated distance between the $j^{th}$ WLAN device of the first subset of reference WLAN devices and the $k^{th}$ potential location of the unknown WLAN device 102. The distance $\|X_{cal_j} - Y_{potential_k}\|$ can be calculated in accordance with Eq. 5b.

$$Y_{potential_k} = \arg\min_{Y_{potential_k}} \left\{ \sum_{i=0}^{N-1} \left( \hat{d}_{cal_j} + d_c - \|X_{cal_j} - Y_{potential_k}\| \right)^2 \right\} \quad \text{Eq. 5a}$$

$$\|X_{cal_j} - Y_{potential_k}\| = \left[ \sum_{s=0}^{D-1} \left( x_{cal_j}^s - y_{potential_k}^s \right)^2 \right]^{\frac{1}{2}} \quad \text{Eq. 5b}$$

In some implementations, by assuming that there is no estimation error {e.g., by assuming that $\{(\hat{d}_{cal_j} + d_c - \|X_{cal_j} - Y_{potential_k}\|)=0\}$, the positioning unit 208 can simplify Eq. 5a and can instead directly solve Eq. 6 for all values of j (i.e., for the first subset of reference WLAN devices) to determine the $k^{th}$ potential location of the unknown WLAN device 102.

$$\hat{d}_{cal_j} = \|X_{cal_j} - Y_{potential_k}\| - d_c \quad \text{Eq. 6}$$

In some implementations (e.g., if the number of the first subset of the reference WLAN devices is greater than the dimension of the coordinate system and J>D) then the positioning unit 208 can execute a Taylor series based TOA positioning algorithm (described below) to iteratively determine one potential location 232 of the unknown WLAN device 102. After the one or more potential locations 232 of the unknown WLAN device 102 (either when J=D or J>D) in accordance with the Taylor series based TOA positioning algorithm, the positioning unit 208 can express a potential location 232 of the unknown WLAN device 102 as the sum of the initial location 224 of the unknown WLAN device ($Y_{init}$) and a location error ($\Delta Y$), as depicted in Eq. 7a. In other words, the location error can be expressed as the difference (or error) between the potential location 232 of the unknown WLAN device 102 and the initial location 224 of the unknown WLAN device. It is noted that in some implementations, the location error can be represented as $\Delta Y=\{\Delta y_s, s=0, 1, \ldots, D-1\}$, where D represents the dimension of the coordinate system and $\Delta y^s$ represents the value of the $s^{th}$ dimension of the location error. The positioning unit 208 can substitute Eq. 7a into Eq. 6 to yield Eq. 7b.

$$Y_{potential_k} = Y_{init} + \Delta Y \qquad \text{Eq. 7a}$$

$$\hat{d}_{cal_j} + d_c = \|X_{cal_j} - Y_{init} - \Delta Y\| \qquad \text{Eq. 7b}$$

The positioning unit 208 can then use Taylor series expansion and neglect the second and higher order terms (e.g., because the higher order terms have a zero or negligible value), to yield Eq. 8. The positioning unit 208 can generate an equation in accordance with Eq. 8 for each of the first subset of the reference WLAN devices and can organize the plurality of generated equations in matrix form to yield Eq. 9.

$$\hat{d}_{cal_j} + d_c = \|X_{cal_j} - Y_{init}\| + \sum_{s=0}^{D-1} \left(-\frac{x^s_{cal_j} - y^s_{init}}{\|X_{cal_j} - Y_{init}\|}\right)\Delta y^s \qquad \text{Eq. 8}$$

$$A_{ToA} = B_{ToA}\, \Delta Y^T \qquad \text{Eq. 9}$$

The location error matrix ($\Delta Y$) can be a 1×D row matrix that represents the difference between the estimated location of the unknown WLAN device 102 and the initial location of the unknown WLAN device 102 as depicted in Exp. 10. More specifically, each element of the location error matrix ($\Delta Y$) can represent the difference between a coordinate of the estimated location of the unknown WLAN device (e.g., the estimated X-coordinate) and an initial location coordinate of the initial location of the unknown WLAN device 102 (e.g., the X-coordinate of the initial location of the unknown WLAN device 102). The distance error matrix ($A_{ToA}$) can be a J×1 column matrix, where each element (i.e., each row) of the $A_{ToA}$ matrix is represented by Exp. 11 and each row is associated with one WLAN device of the first subset of the reference WLAN devices. As depicted by Exp. 11, each element of the distance error matrix represents a combination of A) the average distance 220 between the unknown WLAN device and a WLAN device of the first subset of reference WLAN devices, B) the distance calibration constant 226, and C) the estimated distance between the unknown WLAN device and the WLAN device of the first subset of reference WLAN devices based on the known location of the WLAN device of the first subset of reference WLAN devices and the initial location 224 of the unknown WLAN device 102. The coefficient matrix ($B_{ToA}$) can be a J×D matrix, where J represents the number of reference WLAN devices that constitute the first subset of the reference WLAN devices and D represents the dimension of the coordinate system. Each element of the coefficient matrix can be represented in accordance with Exp. 12. The coefficient matrix ($B_{ToA}$) can comprise the coefficients of the location error matrix ($\Delta Y$) and can represent the relationship between the location error matrix ($\Delta Y$) and the distance error matrix ($A_{ToA}$).

$$\Delta Y = [\Delta y^0 \quad \Delta y^1 \quad \ldots \quad \Delta y^{D-1}] \qquad \text{Exp. 10}$$

$$i^{th} \text{ element of } A_{ToA}: \hat{d}_{cal_j} + d_c - \|X_{cal_j} - Y_{init}\| \qquad \text{Exp. 11}$$

-continued $$(i, s)^{th} \text{ element of } A_{ToA1}: -\frac{x^s_{cal_j} - y^s_{init}}{\|X_{cal_j} - Y_{init}\|} \qquad \text{Exp. 12}$$

In one implementation, the dimension index (e.g., the value of s) can vary from column to column while the WLAN device of the first subset of reference WLAN devices under consideration (e.g., the value of j) can vary from row to row. The dimension index can remain constant throughout a particular column, while the WLAN device of the first subset of reference WLAN devices under consideration can remain constant throughout a particular row. The positioning unit 208 can then calculate the location error $\Delta Y$ in accordance with Eq. 13. It is noted that in some implementations, prior to evaluating Eq. 13, the positioning unit 208 may first determine whether the condition $\det(B_{ToA}^T B_{ToA}) \neq 0$ is satisfied to ensure convergence of the Taylor series based TOA positioning algorithm.

$$\Delta Y_{ToA}^T = (B_{ToA}^T B_{ToA})^{-1} B_{ToA}^T A_{ToA} \qquad \text{Eq. 13}$$

The positioning unit 208 can then use Eq. 7a to calculate the potential location 232 of the unknown WLAN device by summing the location error ($\Delta Y$) with the initial location 224 of the unknown WLAN device 102. In some embodiments, the positioning unit 208 may execute only one iteration of the Taylor series based TOA positioning algorithm (described above) to determine the potential location 232 of the unknown WLAN device. In other embodiments, the positioning unit 208 may execute multiple iterations to determine the potential locations 232 of the unknown WLAN device until the location error is below a threshold error value or until a threshold number of iterations have been executed. It is noted that in other embodiments, the positioning unit 208 can employ other suitable techniques to determine one or more potential locations 232 of the unknown WLAN device 102.

The location selection unit 210 can select the estimated location 234 of the reference WLAN device 102 from the one or more potential locations 232 of the unknown WLAN device based, at least in part, on the second subset of the reference WLAN devices. As described above, in some implementations, some/all of the reference WLAN devices that were not used in calculating the potential locations 232 of the unknown WLAN device 102 can be used to select the estimated location 234 of the unknown WLAN device from the potential locations 232 (i.e., in judging which of the potential locations 232 can best represent the estimated location of the unknown WLAN device). As depicted in FIG. 2, the average distance $\hat{d}_{judge_m}$ 228 associated with each of the second subset of the reference WLAN devices and the known locations $X_{judge_m}$ 230 of the second subset of the reference WLAN devices are provided as inputs to the location selection unit 210. The one or more potential locations 232 (determined by the positioning unit 208) and the distance calibration constant 226 are also provided as inputs to the location selection unit 210. The location selection unit 210 can then select the estimated location ($Y_{output}$) 234 of the unknown WLAN device from the potential locations 232 of the unknown WLAN device 102 based on the above-described inputs. In some implementations, the estimated location 234 of the unknown WLAN device 102 can be represented as $Y_{output} = \{Y_{output}^s, s=0, 1, \ldots, D-1\}$, where D represents the dimension of the coordinate system and $y_{output}^s$ represents the value of the $s^{th}$ dimension of the estimated location of the unknown WLAN device 102. In one implementation, if the positioning unit 208 generates only one potential location 232 of the unknown WLAN device 102, the location selection unit 210 can designate the single potential location 232 of the unknown WLAN device 102 as the estimated location 234 of the unknown WLAN device. This is depicted in Eq. 14a where K represents the number of potential locations of the unknown WLAN device that were determined by the positioning unit 208.

$$Y_{output} = Y_{potential_k} \text{ when } K=1 \qquad \text{Eq. 14a}$$

In another implementation, if the positioning unit 208 generates more than one potential location 232 of the unknown WLAN device 102, the location selection unit 210 can designate the best of the potential locations 232 as the estimated location 234 of the unknown WLAN device. As one example, if K>1, the location selection unit 210 can select (as the estimated location 234 of the unknown WLAN device 102) one of the potential locations 232 that can minimize the total distance error across the second subset of the reference WLAN devices, as depicted in Eq. 14b. In other words, for each of the K potential locations 232, the location selection unit 210 can compute a distance error as the sum (across the second subset of the reference WLAN devices) of the difference between the average distance 228 associated with a WLAN device of the second subset of reference WLAN devices and the estimated distance between the unknown WLAN device (i.e., using the $k^{th}$ potential location) and the WLAN device of the first subset of reference WLAN devices. The location selection unit 210 can compare the distance error associated with each of the K potential locations 232 and can select one of the K potential locations that is associated with the smallest distance error as the estimated location 234 of the unknown WLAN device.

$$Y_{output} = \left\{ \min_{Y_{potential_k}} \sum_{m=0}^{M-1} |\hat{d}_{judge_m} + d_c - \|X_{judge_m} - Y_{potential_k}\| | \right\} \qquad \text{Eq. 14b}$$

As another example, if K>1, the location selection unit 210 can select (as the estimated location 234 of the unknown WLAN device 102) one of the potential locations 232 that can minimize the square of the total distance error across the second subset of the reference WLAN devices, as depicted in Eq. 14c. It is noted that in other implementations, the location selection unit 210 can use other suitable techniques to select the estimated location 234 of the unknown WLAN device from the potential locations 232 of the unknown WLAN device.

$$Y_{output} = \left\{ \min_{Y_{potential_k}} \sum_{m=0}^{M-1} |\hat{d}_{judge_m} + d_c - \|X_{judge_m} - Y_{potential_k}\| |^2 \right\} \qquad \text{Eq. 14c}$$

Figure 3:
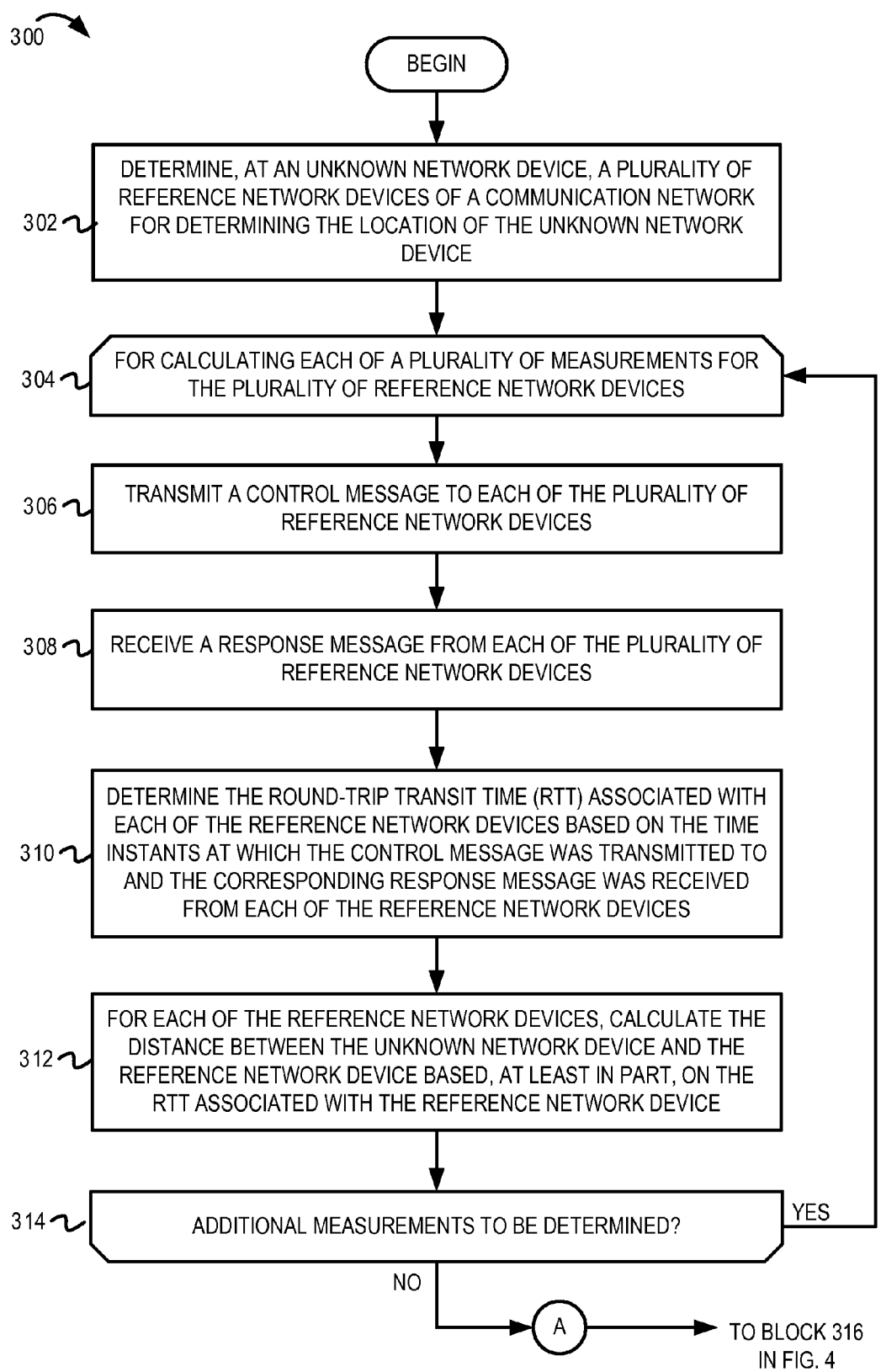
FIG. 3 is a flow diagram illustrating example operations of a TOA positioning mechanism.
Figure 4:
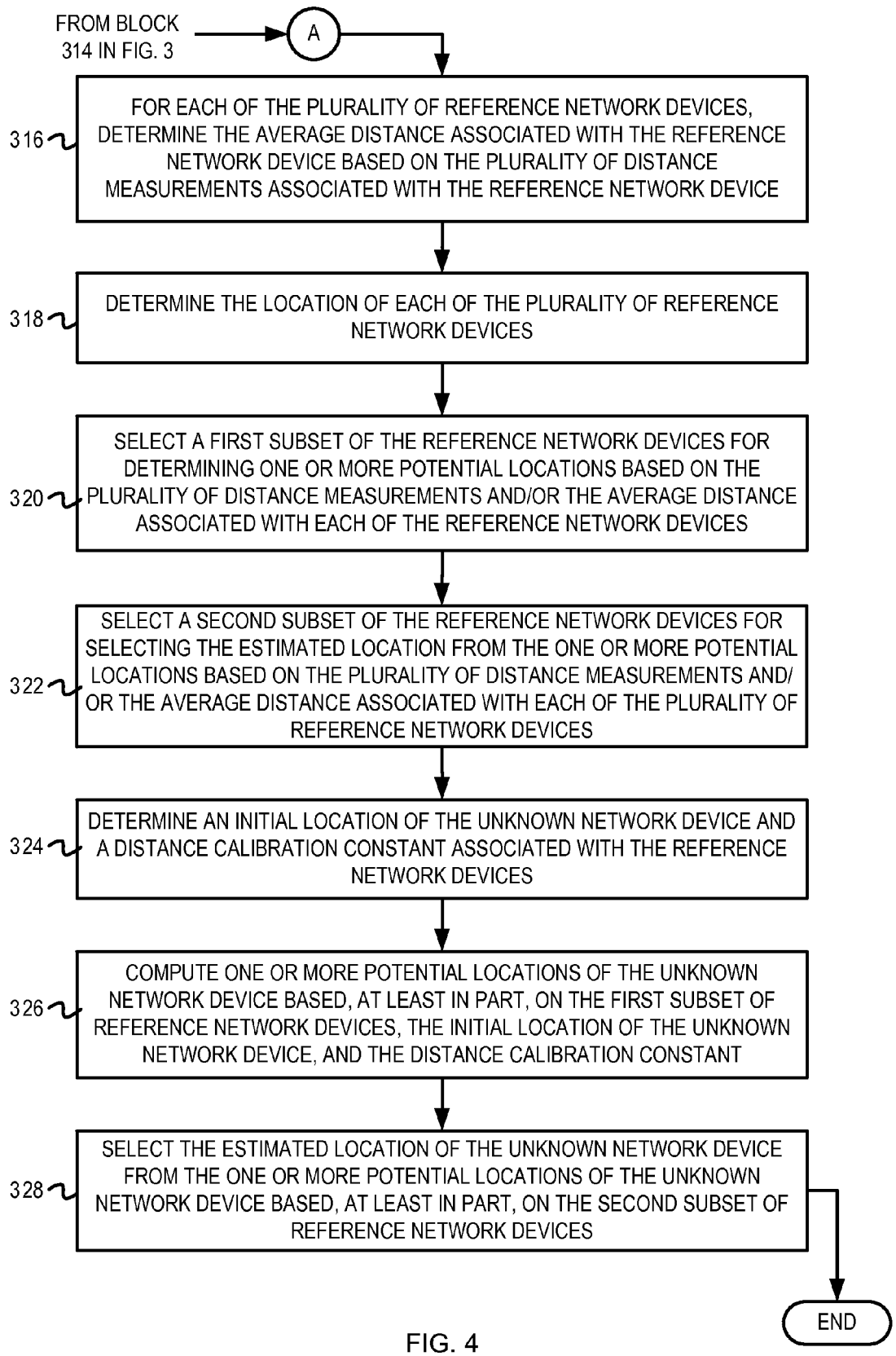
FIG. 4 is a continuation of FIG. 3 and also illustrates example operations of a TOA positioning mechanism.

FIG. 3 depicts a flow diagram ("flow") 300 illustrating example operations of a TOA positioning mechanism. The flow 300 begins at block 302.

At block 302, an unknown network device determines a plurality of reference network devices of a communication network for determining the location of the unknown network device. With reference to the example of FIG. 1, the location calculation unit 110 of the unknown WLAN device 102 can identify the reference WLAN devices 104, 106, 108, and 112 based on which to determine the location of the unknown WLAN device 102. In some implementations, the location calculation unit 110 can identify the reference WLAN devices 104, 106, 108, and 112 from multiple WLAN devices in the wireless communication network 100 based on analyzing one or more performance measurements associated with the plurality of WLAN devices. For example, the location calculation unit 110 can identify N WLAN devices in the wireless communication network 100 that are associated with the highest received signal strength indicator (RSSI), the lowest packet error rate (PER), etc. The flow continues at block 304.

At block 304, a loop begins for calculating a plurality of measurements for the plurality of the reference WLAN devices. For example, the location calculation unit 110 can initiate a loop to determine the plurality of measurements (e.g., RTT measurements and distance measurements) for the plurality of the reference WLAN devices (as will be described below in blocks 306-312). The flow continues at block 306.

At block 306, a control message is transmitted to each of the plurality of reference network devices. For example, the location calculation unit 110 can transmit a control message to the reference WLAN device 104. The control message can comprise one or more of an identifier associated with the unknown WLAN device 102, an identifier associated with the reference WLAN device 104, and a suitable payload (e.g., a predetermined combination of symbols, a NULL payload, etc.). The location calculation unit 110 can also record the time instant at which the control message was transmitted to the reference WLAN device 104. Likewise, with reference to FIG. 1, the location calculation unit 110 can also record the time instants at which control messages were transmitted to the reference WLAN devices 106, 108, and 112. The flow continues at block 308.

At block 308, a response message is received from each of the plurality of reference network devices. For example, the location calculation unit 110 can receive the response message from the reference WLAN device 104. The response message can be a WLAN acknowledgment (ACK) message or any suitable message that indicates receipt of the control message (transmitted at block 304) at the reference WLAN device 104. The location calculation unit 110 can also record the time instant at which the response message was received at the unknown WLAN device 102. Likewise, with reference to FIG. 1, the location calculation unit 110 can also record the time instants at which response messages were received from the reference WLAN devices 106, 108, and 112. The flow continues at block 310.

At block 310, the round-trip transit time (RTT) associated with each of the plurality of reference network devices is determined. In one implementation, the location calculation unit 110 can determine the RTT associated with the reference WLAN device 104 based on the time instants at which the control message was transmitted to the reference WLAN device 104 (recorded at block 306) and the time instant at which the response message was received from the reference network device 104 (recorded at block 308). The location calculation unit 110 can compute the RTT associated with the reference WLAN device 104 by subtracting the time instant at which the control message was transmitted from the time instant at which the response message was received. It is noted that in other implementations, the location calculation unit 110 can employ other suitable techniques to determine the RTT associated with the reference WLAN device 104. Likewise, with reference to FIG. 1, the location calculation unit 110 can also determine the RTT associated with the reference WLAN devices 106, 108, and 112. The flow continues at block 312.

At block 312, for each of the plurality of reference network devices, the distance between the unknown network device and the reference network device is calculated based, at least in part, on the RTT associated with the reference network device. For example, the location calculation unit 110 (e.g., the distance calculation unit 202 of FIG. 2) can calculate the distance between the unknown WLAN device 102 and each of the reference network devices 104, 106, 108, and 112 based, at least in part, on the RTT associated with the corresponding reference WLAN device as described above with reference to Eq. 1 of FIG. 2. It is noted that in other implementations, the distance calculation unit 202 can use other suitable techniques to determine the distance between the unknown WLAN device 102 and each of the reference WLAN devices 104, 106, 108, and 112. The flow continues at block 314.

At block 314, it is determined whether additional measurements are to be determined for each of the plurality of the reference network devices. In one example, the location calculation unit 110 can determine whether a predetermined number of measurements (e.g., RTT measurements and distance measurements) have been determined for each of the plurality of reference WLAN devices. As another example, the location calculation unit 110 can determine whether a predetermined measurement time interval (for determining the measurements) has elapsed. If it is determined that additional measurements are to be determined for each of the plurality of the reference WLAN devices, the flow loops back to block 304 where the next RTT measurement and distance measurement are calculated for each of the plurality of reference WLAN devices. If it is determined that the requisite measurements have been determined for each of the plurality of the reference WLAN devices, the flow continues at block 316 in FIG. 4.

At block 316, for each of the plurality of reference network devices, the average distance associated with the reference network device is determined based on the plurality of distance measurements associated with the reference network device. For example, the location calculation unit 110 (e.g., the average calculation unit 204) can determine for each of the plurality of reference network devices, the average distance associated with the reference network device is determined based on the plurality of distance measurements associated with the reference network device, as described above with reference to Eq. 2 of FIG. 2. The flow continues at block 318.

At block 318, the location of each of the plurality of reference network devices is determined. For example, the location calculation unit 110 can determine the known location of each of the plurality of reference WLAN devices 104, 106, 108, and 112. As described herein, i represents a counter for the reference WLAN devices and $X_i$ represents the location 216 (e.g., also referred to as absolute location, actual location, or real location) of the $i^{th}$ reference WLAN device. In one implementation, the location of the $i^{th}$ reference WLAN device can be represented in the form, $X_i = \{x_i^s, s=0, 1, \ldots, D-1\}$, where D represents the dimension of the coordinate system and $x_i^s$ represents the value of the $s^{th}$ dimension of the location of the $i^{th}$ reference WLAN device. The flow continues at block 320.

At block 320, a first subset of the reference network devices is selected based on the plurality of distance measurements and/or the average distance associated with each of the plurality of reference network devices. For example, the location calculation unit 110 (e.g., the distance selection unit 206) can select the first subset of the reference network devices for determining one or more potential locations of the unknown WLAN device 102. In one example, the first subset of the reference WLAN devices can be selected as those of the plurality of reference network devices that are associated with the smallest average distance, as described with reference to FIG. 2. As another example, the first subset of the reference WLAN devices can be selected based on analyzing the plurality of distance measurements (e.g., based on the variances) associated with each of the reference network devices, as described above with reference to FIG. 2. The flow continues at block 322.

At block 322, a second subset of the reference network devices is selected based on the plurality of distance measurements and/or the average distance associated with the plurality of reference network devices. For example, the location calculation unit 110 (e.g., the distance selection unit 206) can select the second subset of the reference network devices for determining the estimated location of the unknown WLAN device from the one or more potential locations of the unknown WLAN device 102. In one example, the second subset of the reference WLAN devices can be selected (e.g., based on the average distances or the variances) from the reference WLAN devices that were not selected as the first subset of the reference WLAN devices, as described with reference to FIG. 2. The flow continues at block 324.

At block 324, an initial location of the unknown network device and a distance calibration constant associated with the reference network devices are determined. For example, the location calculation unit 110 can determine the initial location 224 and the distance calibration constant 226. In some implementations, as described above with reference to FIGS. 1 and 2, the initial location 224 of the unknown WLAN device 102 can any suitable predetermined value (e.g., zero) or randomly selected value. In some implementations, as described above with reference to FIGS. 1 and 2, the distance calibration constant 226 can any suitable predetermined value. However, if the predetermined value is unknown or not available, the distance calibration constant 226 can be zero or another randomly selected value. In other implementations, other suitable algorithms and techniques can be employed to determine an appropriate distance calibration constant and/or the initial location of the unknown WLAN device and to ensure convergence to the actual location of the unknown WLAN device. The flow continues at block 326.

At block 326, one or more potential locations of the unknown network device are computed based, at least in part, on the first subset of reference network devices, the initial location of the unknown network device, and the distance calibration constant. For example, the location calculation unit 110 (e.g., the positioning unit 208) can compute one or more potential locations 232 of the unknown WLAN device 102. As described above with reference to FIG. 2 (e.g., Eq. 5a-Eq. 13), the positioning unit 208 can use at least the average distance 220 associated with the first subset of reference network devices, the known locations 222 of the first subset of reference network devices, the initial location 224 of the unknown network device, and the distance calibration constant 226 to determine the potential locations 232 of the unknown WLAN device 102. The one or more potential locations 232 of the unknown WLAN device can be determined using an MMSE based TOA positioning algorithm, a Taylor series based TOA positioning algorithm or other suitable positioning techniques. The flow continues at block 328.

At block 328, the estimated location of the unknown network device is selected from the one or more potential locations of the unknown network device based, at least in part, on the second subset of the reference network devices. For example, the location calculation unit 110 (e.g., the location selection unit 210) can select the estimated location of the unknown network device from the one or more potential locations of the unknown WLAN device 102. As described above with reference to FIG. 2 (e.g., Eq. 14a-14c), the location selection unit 210 can use at least the average distance 228 associated with the second subset of reference network devices, the known locations 230 of the second subset of reference network devices, the potential locations 232 of the unknown WLAN device, and the distance calibration constant 226 to determine the estimated location 234 of the unknown WLAN device. From block 328, the flow ends.

It should be understood that FIGS. 1-4 are examples meant to aid in understanding embodiments and should not be used to limit embodiments or limit scope of the claims. Embodiments may perform additional operations, fewer operations, operations in a different order, operations in parallel, and some operations differently. Although the Figures refer to the unknown WLAN device 102 executing operations described herein to determine the location of the unknown WLAN device 102, embodiments are not so limited. In other embodiments, functionality for determining the location of the unknown WLAN device 102 can be executed by one or more other suitable electronic devices. In some implementations, one or more of the reference WLAN devices, a centralized server, and/or another suitable electronic device can execute some/all of the operations for determining the location of the unknown WLAN device 102. For example, the unknown WLAN device 102 can determine the plurality of RTT measurements associated with each of the reference WLAN devices 102, 106, 108, and 112 and can provide the pluralities of RTT measurements to the centralized server (or another device to which the processing has been offloaded). The centralized server can then determine the estimated location of the unknown WLAN device 102 (as described by FIGS. 1-4) and can communicate the determined location to the unknown WLAN device 102.

It is noted that although FIG. 3 depicts the location calculation unit 110 simultaneously determining each RTT measurement and corresponding distance measurement associated with the plurality of reference WLAN devices, embodiments are not so limited. In other embodiments, the location calculation unit 110 can successively analyze each of the reference WLAN devices to determine the plurality of RTT measurements and the plurality of distance measurements. For example, the location calculation unit 110 can determine the plurality of RTT measurements and the plurality of distance measurements associated with a first reference WLAN device. Next, the location calculation unit 110 can determine the plurality of RTT measurements and the plurality of distance measurements associated with a second reference WLAN device, and so on. In another embodiment, the location calculation unit 110 can determine a first RTT measurement and a corresponding first distance measurement associated with each of the reference WLAN devices. Next, the location calculation unit 110 can determine a second RTT measurement and a corresponding second distance measurement associated with each of the reference WLAN devices, and so on.

Lastly, it is noted that although FIGS. 1-4 refer to the devices 102, 104, 106, 108, and 112 being WLAN devices and employing WLAN communication technologies, embodiments are not so limited. In other implementations, the devices 102, 104, 106, 108, and 112 can be wired devices that employ wired communication technologies (e.g., Ethernet, powerline communication, etc.) for executing the operations described herein. Furthermore, in some implementations, the devices 102, 104, 106, 108, and 112 can employ both wireless communication technologies and wired communication technologies. It is also noted that the wireless communication technology implemented by the devices 102, 104, 106, 108, and 112 is not limited to WLAN technologies (e.g., 802.11 technologies). In other implementations, the devices 102, 104, 106, 108, and 112 may implement other wireless technologies/protocols, such as Bluetooth, WiMAX, etc.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
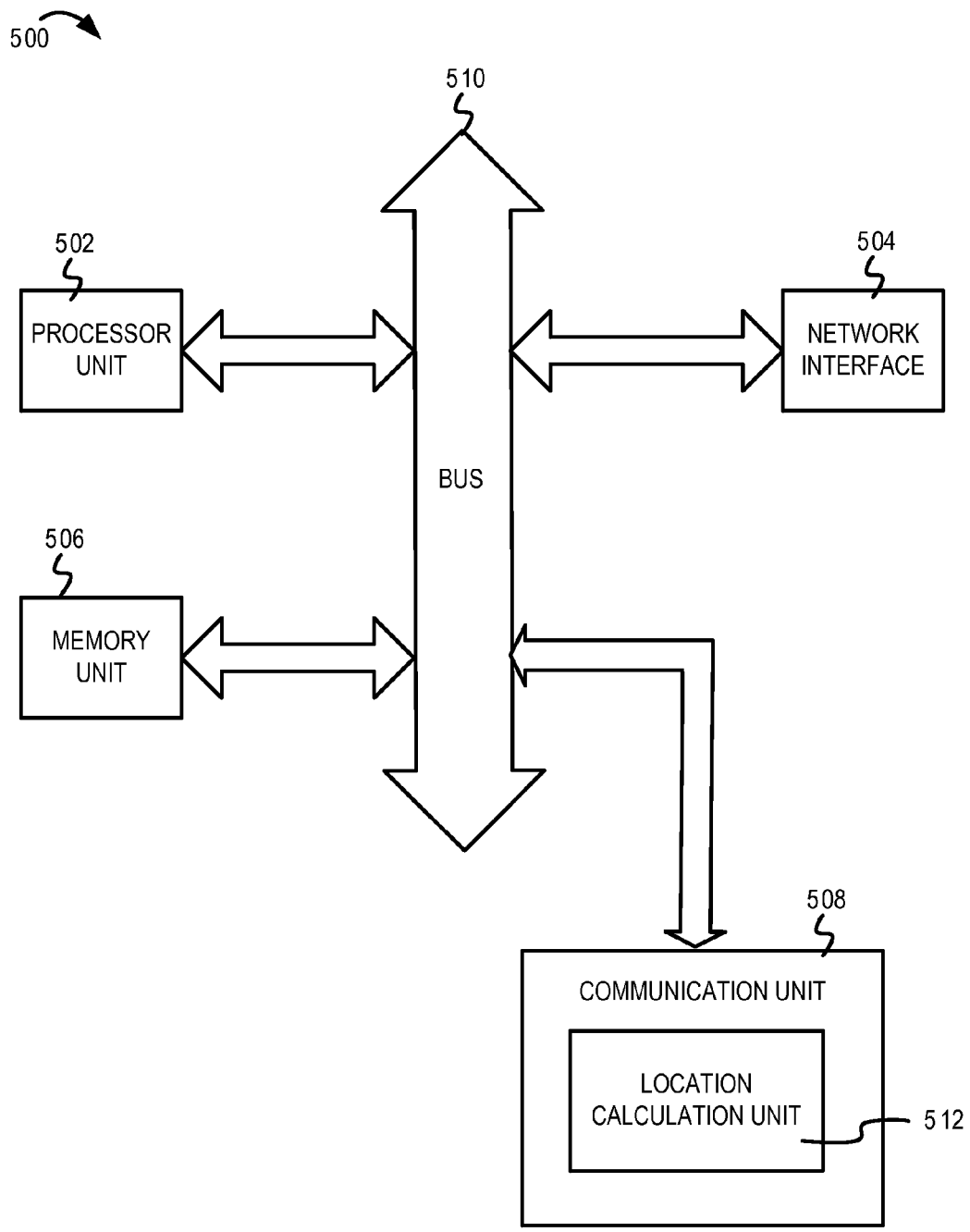
FIG. 5 is a block diagram of one embodiment of an electronic device including a mechanism for determining the location of the electronic device in a wireless communication network.

FIG. 5 is a block diagram of one embodiment of an electronic device 500 including a mechanism for determining the location of the electronic device in a wireless communication network. In some implementations, the electronic device 500 may be one of a laptop computer, a tablet computer, a netbook, a mobile phone, a smart appliance, a gaming console, or other electronic systems comprising wireless communication capabilities. The electronic device 500 includes a processor unit 502 (possibly including multiple processors, multiple cores, multiple nodes, and/or implementing multi-threading, etc.). The electronic device 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 500 also includes a bus 510 (e.g., PCI, ISA, PCI-Express, HyperTransport®, InfiniBand®, NuBus, AHB, AXI, etc.), and a network interface 504 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.).

The electronic device 500 also includes a communication unit 508. The communication unit 508 comprises a location calculation unit 512. The location calculation unit 512 can calculate one or more potential locations of the electronic device 500 based, at least in part, on a first subset of reference WLAN devices and can select the estimated location of the electronic device 500 from the one or more potential locations based, at least in part, on a second subset of reference WLAN devices, as described above with reference to FIGS. 1-4. Any one of these functionalities may be partially (or entirely) implemented in hardware and/or on the processor unit 502. For example, the functionality may be implemented with an application specific integrated circuit, in logic implemented in the processor unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the memory unit 506, and the network interfaces 504 are coupled to the bus 510. Although illustrated as being coupled to the bus 510, the memory unit 506 may be coupled to the processor unit 502.

While the embodiments are described with reference to various implementations and exploitations, it will be understood that these embodiments are illustrative and that the scope of the inventive subject matter is not limited to them. In general, techniques for a time of arrival (TOA) based positioning system as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining, for each of a plurality of reference wireless network devices of a communication network, a distance between a first wireless network device and the reference wireless network device based, at least in part, on a round trip transit time between the first wireless network device and the reference wireless network device;
    selecting a first subset of the plurality of reference wireless network devices for determining a plurality of potential locations of the first wireless network device based, at least in part, on the distance between the first wireless network device and each of the plurality of reference wireless network devices;
    selecting a second subset of the plurality of reference wireless network devices for estimating a current location of the first wireless network device based, at least in part, on the first subset of the reference wireless network devices and the distance between the first wireless network device and each of the plurality of reference wireless network devices;
    determining the plurality of potential locations based, at least in part, on the first subset of the reference wireless network devices; and
    estimating the current location from the plurality of potential locations based, at least in part, on the second subset of the reference wireless network devices.

2. The method of claim 1, wherein said determining, for each of the plurality of reference wireless network devices, the distance between the first wireless network device and the reference wireless network device comprises:
    for each of the plurality of reference wireless network devices, determining an average distance between the first wireless network device and the reference wireless network device based, at least in part, on a plurality of distance measurements between the first wireless network device and the reference wireless network device.

3. The method of claim 2, wherein said selecting the first subset of the reference wireless network devices comprises:
    for each of the plurality of reference wireless network devices, determining a distance variance associated with the reference wireless network device based, at least in part, on the plurality of distance measurements between the first wireless network device and the reference wireless network device and the average distance associated with the reference wireless network device; and
    selecting a predetermined number of the plurality of reference wireless network devices associated with lowest distance variances as the first subset of the reference wireless network devices based, at least in part, on comparing the distance variance associated with each of the plurality of reference wireless network devices.

4. The method of claim 2, wherein said selecting the second subset of the reference wireless network devices comprises:
    identifying a remainder of the plurality of reference wireless network devices that do not include the first subset of the reference wireless network devices; and
    selecting a predetermined number of the remainder of the plurality of reference wireless network devices associated with shortest average distances as the second subset of the reference wireless network devices based, at least in part, on comparing the average distance associated with each of the remainder of the plurality of reference wireless network devices.

5. The method of claim 2, wherein said selecting the second subset of the reference wireless network devices comprises:
    identifying a remainder of the plurality of reference wireless network devices that do not include the first subset of the reference wireless network devices;
    for each of the remainder of the plurality of reference wireless network devices, determining a distance variance associated with the reference wireless network device based, at least in part, on the plurality of distance measurements between the first wireless network device and the reference wireless network device and the average distance associated with the reference wireless network device; and selecting a predetermined number of the remainder of the plurality of reference wireless network devices associated with lowest distance variances as the second subset of the reference wireless network devices based, at least in part, on comparing the distance variance associated with each of the remainder of the plurality of reference wireless network devices.

6. The method of claim 2, wherein said estimating the current location comprises:

selecting a first potential location of the plurality of potential locations as the current location of the first wireless network device based, at least in part, on the average distance associated with each of the second subset of the reference wireless network devices, a location of each of the second subset of the reference wireless network devices, and a distance calibration constant.

7. The method of claim 2, wherein said estimating the current location comprises:

for each of the plurality of potential locations of the first wireless network device,
  determining a distance error associated with the potential location based, at least in part, on the average distance associated with each of the second subset of the reference wireless network devices, the potential location of the wireless network device, and a location of each of the second subset of the reference wireless network devices;

selecting a first potential location of the plurality of potential locations associated with a lowest distance error based, at least in part, on comparing the distance error associated with each of the plurality of potential locations; and designating the first potential location associated with the lowest distance error as the current location of the first wireless network device.

8. The method of claim 2, wherein said estimating the current location comprises:

for each of the plurality of potential locations of the first wireless network device,
  determining a squared distance error associated with the potential location based, at least in part, on the average distance associated with each of the second subset of the reference wireless network devices, the potential location of the wireless network device, and a location of each of the second subset of the reference wireless network devices;

selecting a first potential location of the plurality if potential locations associated with a lowest squared distance error based, at least in part on, on comparing the squared distance error associated with each of the plurality of potential locations; and designating the first potential location associated with the lowest squared distance error as the current location of the first wireless network device.

9. The method of claim 2, wherein said selecting the first subset of the reference wireless network devices comprises:

selecting a predetermined number of the plurality of reference wireless network devices associated with shortest average distances as the first subset of the reference wireless network devices based, at least in part, on comparing the average distance associated with each of the plurality of reference wireless network devices.

10. The method of claim 1, wherein said selecting the second subset of the reference wireless network devices comprises:

selecting the second subset of the reference wireless network devices that is distinct from the first subset of the reference wireless network devices.

11. The method of claim 1, wherein said determining the plurality of potential locations of the first wireless network device comprises:

executing a minimum mean square error based time of arrival positioning algorithm to determine the plurality of potential locations based, at least in part, on an average distance between the first wireless network device and each of the first subset of the reference wireless network devices, a location of each of the first subset of the plurality of reference wireless network devices, and a distance calibration constant, or executing iterations of a Taylor series based time of arrival positioning algorithm to determine a first of the plurality of potential locations based, at least in part, on the average distance between the first wireless network device and each of the first subset of the reference wireless network devices, the location of each of the first subset of the reference wireless network devices, an initial location of the first wireless network device, and the distance calibration constant.

12. The method of claim 1, wherein the first wireless network device and the plurality of reference wireless network devices comprise wireless local area network (WLAN) communication capabilities.

13. The method of claim 1, wherein said determining, for each of the plurality of reference wireless network devices, the distance between the first wireless network device and the reference wireless network device comprises:

for each of the plurality of reference wireless network devices,
  determining a plurality of round trip transit time measurements between the first wireless network device and the reference wireless network device;
  determining a plurality of distance measurements between the first wireless network device and the reference wireless network device based, at least in part, on the plurality of round trip transit time measurements between the first wireless network device and the reference wireless network device; and
  determining an average distance between the first wireless network device and the reference wireless network device based, at least in part, on the plurality of distance measurements between the first wireless network device and the reference wireless network device.

14. A first wireless network device comprising:

a network interface; and a location calculation unit coupled with the network interface, the location calculation unit operable to:
  determine, for each of a plurality of reference wireless network devices of a communication network, a distance between the first wireless network device and the reference wireless network device based, at least in part, on a round trip transit time between the first wireless network device and the reference wireless network device;
  select a first subset of the plurality of reference wireless network devices for determining a plurality of potential locations of the first wireless network device based, at least in part, on the distance between the first wireless network device and each of the plurality of reference wireless network devices;

select a second subset of the plurality of reference wireless network devices for estimating a current location of the first wireless network device based, at least in part, on the first subset of the reference wireless network devices and the distance between the first wireless network device and each of the plurality of reference wireless network devices;

determine the plurality of potential locations based, at least in part, on the first subset of the reference wireless network devices; and estimate the current location from the plurality of potential locations based, at least in part, on the second subset of the reference wireless network devices.

15. The first wireless network device of claim 14, wherein the location calculation unit operable to determine, for each of the plurality of reference wireless network devices, the distance between the first wireless network device and the reference wireless network device comprises the location calculation unit operable to:

for each of the plurality of reference wireless network devices, determine an average distance between the first wireless network device and the reference wireless network device based, at least in part, on a plurality of distance measurements between the first wireless network device and the reference wireless network device.

16. The first wireless network device of claim 15, wherein the location calculation unit operable to select the first subset of the reference wireless network devices comprises the location calculation unit operable to:

for each of the plurality of reference wireless network devices, determine a distance variance associated with the reference wireless network device based, at least in part, on the plurality of distance measurements between the first wireless network device and the reference wireless network device and the average distance associated with the reference wireless network device; and select a predetermined number of the plurality of reference wireless network devices associated with lowest distance variances as the first subset of the reference wireless network devices based, at least in part, on the location calculation unit comparing the distance variance associated with each of the plurality of reference wireless network devices.

17. The first wireless network device of claim 15, wherein the location calculation unit operable to select the second subset of the reference wireless network devices comprises the location calculation unit operable to:

identify a remainder of the plurality of reference wireless network devices that do not include the first subset of the reference wireless network devices; and select a predetermined number of the remainder of the plurality of reference wireless network devices associated with shortest average distances as the second subset of the reference wireless network devices based, at least in part, on the location calculation unit comparing the average distance associated with each of the remainder of the plurality of reference wireless network devices.

18. The first wireless network device of claim 15, wherein the location calculation unit operable to select the second subset of the reference wireless network devices comprises the location calculation unit operable to:

identify a remainder of the plurality of reference wireless network devices that do not include the first subset of the reference wireless network devices;

for each of the remainder of the plurality of reference wireless network devices, determine a distance variance associated with the reference wireless network device based, at least in part, on the plurality of distance measurements between the first wireless network device and the reference wireless network device and the average distance associated with the reference wireless network device; and select a predetermined number of the remainder of the plurality of reference wireless network devices associated with lowest distance variances as the second subset of the reference wireless network devices based, at least in part, on the location calculation unit comparing the distance variance associated with each of the remainder of the plurality of reference wireless network devices.

19. The first wireless network device of claim 15, wherein the location calculation unit operable to estimate the current location comprises the location calculation unit operable to:

for each of the plurality of potential locations of the wireless network device, determine a squared distance error associated with the potential location based, at least in part, on the average distance associated with each of the second subset of the reference wireless network devices, the potential location of the wireless network device, and a location of each of the second subset of the reference wireless network devices;

select a first potential location of the plurality of potential locations associated with a lowest squared distance error based, at least in part, on the location calculation unit comparing the squared distance error associated with each of the plurality of potential locations; and designate the first potential location associated with the lowest squared distance error as the current location of the first wireless network device.

20. The first wireless network device of claim 15, wherein the location calculation unit operable to select the first subset of the reference wireless network devices comprises the location calculation unit operable to:

select a predetermined number of the plurality of reference wireless network devices associated with shortest average distances as the first subset of the reference wireless network devices based, at least in part, on the location calculation unit comparing the average distance associated with each of the plurality of reference wireless network devices.

21. The first wireless network device of claim 14, wherein the location calculation unit operable to select the second subset of the reference wireless network devices comprises the location calculation unit operable to:

select the second subset of the reference wireless network devices that is distinct from the first subset of the reference wireless network devices.

22. A non-transitory machine-readable storage medium having instructions stored therein, which when executed by a processor causes the processor to perform operations that comprise:

determining, for each of a plurality of reference wireless network devices of a communication network, a distance between a first wireless network device and the reference wireless network device based, at least in part, on a round trip transit time between the first wireless network device and the reference wireless network device;

selecting a first subset of the plurality of reference wireless network devices for determining a plurality of potential locations of the first wireless network device based, at least in part, on the distance between the first wireless network device and each of the plurality of reference wireless network devices;
selecting a second subset of the plurality of reference wireless network devices for estimating a current location of the first wireless network device based, at least in part, on the first subset of the reference wireless network devices and the distance between the first wireless network device and each of the plurality of reference wireless network devices;
determining the plurality of potential locations based, at least in part, on the first subset of the reference wireless network devices; and
estimating the current location from the plurality of potential locations based, at least in part, on the second subset of the reference wireless network devices.

23. The non-transitory machine-readable storage medium of claim 22, wherein said operation of determining, for each of the plurality of reference wireless network devices, the distance between the first wireless network device and the reference wireless network device comprises:
for each of the plurality of reference wireless network devices, determining an average distance between the first wireless network device and the reference wireless network device based, at least in part, on a plurality of distance measurements between the first wireless network device and the reference wireless network device.

24. The non-transitory machine-readable storage medium of claim 23, wherein said operation of selecting the first subset of the reference wireless network devices comprises:
for each of the plurality of reference wireless network devices, determining a distance variance associated with the reference wireless network device based, at least in part, on the plurality of distance measurements between the first wireless network device and the reference wireless network device and the average distance associated with the reference wireless network device; and
selecting a predetermined number of the plurality of reference wireless network devices associated with lowest distance variances as the first subset of the reference wireless network devices based, at least in part, on comparing the distance variance associated with each of the plurality of reference wireless network devices.

25. The non-transitory machine-readable storage medium of claim 23, wherein said operation of selecting the second subset of the reference wireless network devices comprises:
identifying a remainder of the plurality of reference wireless network devices that do not include the first subset of the reference wireless network devices; and
selecting a predetermined number of the remainder of the plurality of reference wireless network devices associated with shortest average distances as the second subset of the reference wireless network devices based, at least in part, on comparing the average distances associated with each of the remainder of the plurality of reference wireless network devices.

26. The non-transitory machine-readable storage medium of claim 23, wherein said operation of selecting the second subset of the reference wireless network devices comprises:
identifying a remainder of the plurality of reference wireless network devices that do not include the first subset of the reference wireless network devices;
for each of the remainder of the plurality of reference wireless network devices, determining a distance variance associated with the reference wireless network device based, at least in part, on the plurality of distance measurements between the first wireless network device and the reference wireless network device and the average distance associated with the reference wireless network device; and
selecting a predetermined number of the remainder of the plurality of reference wireless network devices associated with lowest distance variances as the second subset of the reference wireless network devices based, at least in part, on comparing the distance variance associated with each of the remainder of the plurality of reference wireless network devices.

27. The non-transitory machine-readable storage medium of claim 23, wherein said operation of estimating the current location comprises:
for each of the plurality of potential locations of the wireless network device, determining a distance error associated with the potential location based, at least in part, on the average distance associated with each of the second subset of the reference wireless network devices, the potential location of the first wireless network device, and a location of each of the second subset of the reference wireless network devices;
selecting a first potential location of the plurality of potential locations associated with a lowest distance error based, at least in part, on comparing the distance error associated with each of the plurality of potential locations; and
designating the first potential location associated with the lowest distance error as the current location of the first wireless network device.

28. The non-transitory machine-readable storage medium of claim 23, wherein said operation of selecting the first subset of the reference wireless network devices comprises:
selecting a predetermined number of the plurality of reference wireless network devices associated with shortest average distances as the first subset of the reference wireless network devices based, at least in part, on comparing the average distance associated with each of the plurality of reference wireless network devices.

29. The non-transitory machine-readable storage medium of claim 22, wherein said operation of selecting the second subset of the reference wireless network devices comprises:
selecting the second subset of the reference wireless network devices that is distinct from the first subset of the reference wireless network devices.

* * * * *